US00RE38595E1

(19) United States
(12) Reissued Patent
Kuroda et al.

(10) Patent Number: US RE38,595 E
(45) Date of Reissued Patent: Sep. 21, 2004

(54) ROTATION CONTROL APPARATUS OPERATING WITH A SYNC SIGNAL HAVING VARIABLE INTERVALS

(75) Inventors: Kazuo Kuroda, Tokorozawa (JP); Masayoshi Yoshida, Tokorozawa (JP); Toshio Suzuki, Tokorozawa (JP)

(73) Assignee: Pioneer Electronic Corporation, Tokyo (JP)

(21) Appl. No.: 09/899,104

(22) Filed: Jul. 6, 2001

Related U.S. Patent Documents

Reissue of:
(64) Patent No.: 5,920,530
Issued: Jul. 6, 1999
Appl. No.: 09/191,999
Filed: Nov. 16, 1998

U.S. Applications:

(63) Continuation of application No. 08/816,138, filed on Mar. 12, 1997, now Pat. No. 5,875,163.

(30) Foreign Application Priority Data

Mar. 13, 1996 (JP) ..... P8-84578

(51) Int. Cl.[7] ..... G11B 7/00
(52) U.S. Cl. ..... 369/47.32
(58) Field of Search ..... 369/44.26, 47.32, 369/47.27, 47.28, 47.31

(56) References Cited

U.S. PATENT DOCUMENTS 4,761,775 A * 8/1988 Murakami ..... 369/44.26
4,908,810 A * 3/1990 Oie
5,093,820 A * 3/1992 Maeda et al.
5,095,475 A * 3/1992 Ishikawa
5,420,842 A * 5/1995 Shimizu
5,432,766 A * 7/1995 Ando et al.
5,708,649 A * 1/1998 Kamoto et al. ..... 369/48
5,764,610 A * 6/1998 Yoshida et al. ..... 369/58

* cited by examiner

*Primary Examiner*—Thang V. Tran
(74) *Attorney, Agent, or Firm*—Sughrue Mion, PLLC

(57) ABSTRACT

A rotation control apparatus which can maintain an accurate rotating state even in a high density optical disk (DVD) having a structure such that parts of the sync signal are recorded at an interval different from that of the other sync signal parts. The apparatus has: a unit period signal generator for generating a period signal of a unit period; a pre-pit detector for detecting a pre-pit from the DVD; a phase difference detector for detecting a phase difference between the detection timing of the pre-pit and the unit period signal; and a holding circuit for holding the phase difference detected. The rotation of the DVD is controlled on the basis of the phase difference held at the holding circuit.

7 Claims, 11 Drawing Sheets

EXAMPLE OF DVD-R IN WHICH
PRE-PIT IS FORMED ON LAND TRACK

DETECTION PATTERN OF SYNC PRE SIGNAL

SCHEMATIC CONSTRUCTION OF PICKUP AND PRE-PIT SIGNAL GENERATOR OF EMBODIMENT

PHASE COMPARING CIRCUIT 14

PHASE COMPARING CIRCUIT 15

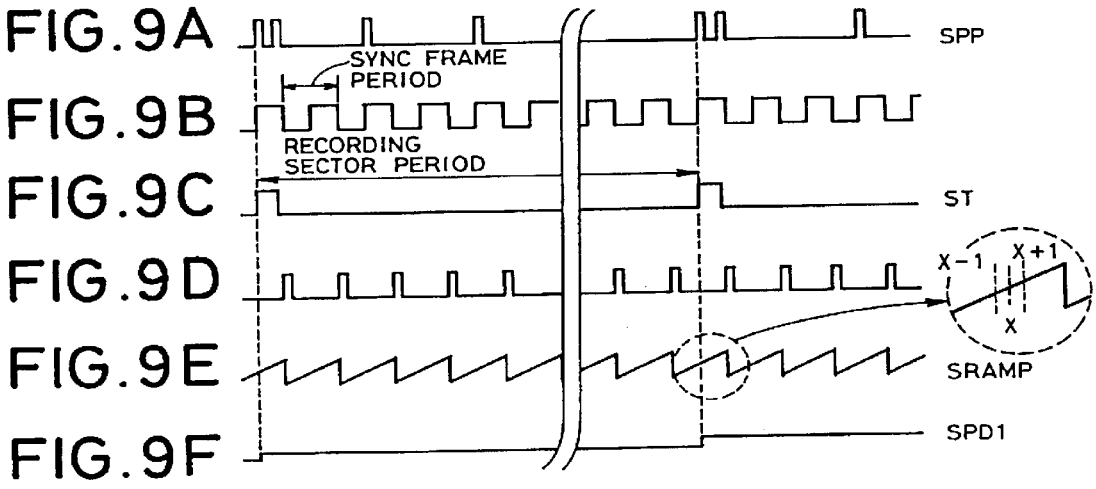
FIG.9A
FIG.9B
FIG.9C
FIG.9D
FIG.9E
FIG.9F
SYNC FRAME PERIOD
RECORDING SECTOR PERIOD
SPP
ST
X-1
X+1
X
SRAMP
SPD1
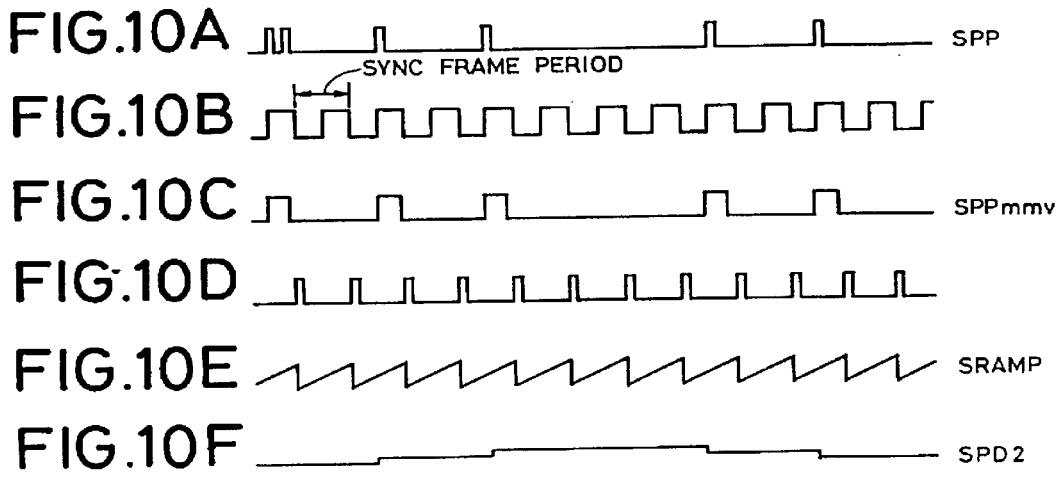
FIG.10A
FIG.10B
FIG.10C
FIG.10D
FIG.10E
FIG.10F
SYNC FRAME PERIOD
SPP
SPPmmv
SRAMP
SPD2

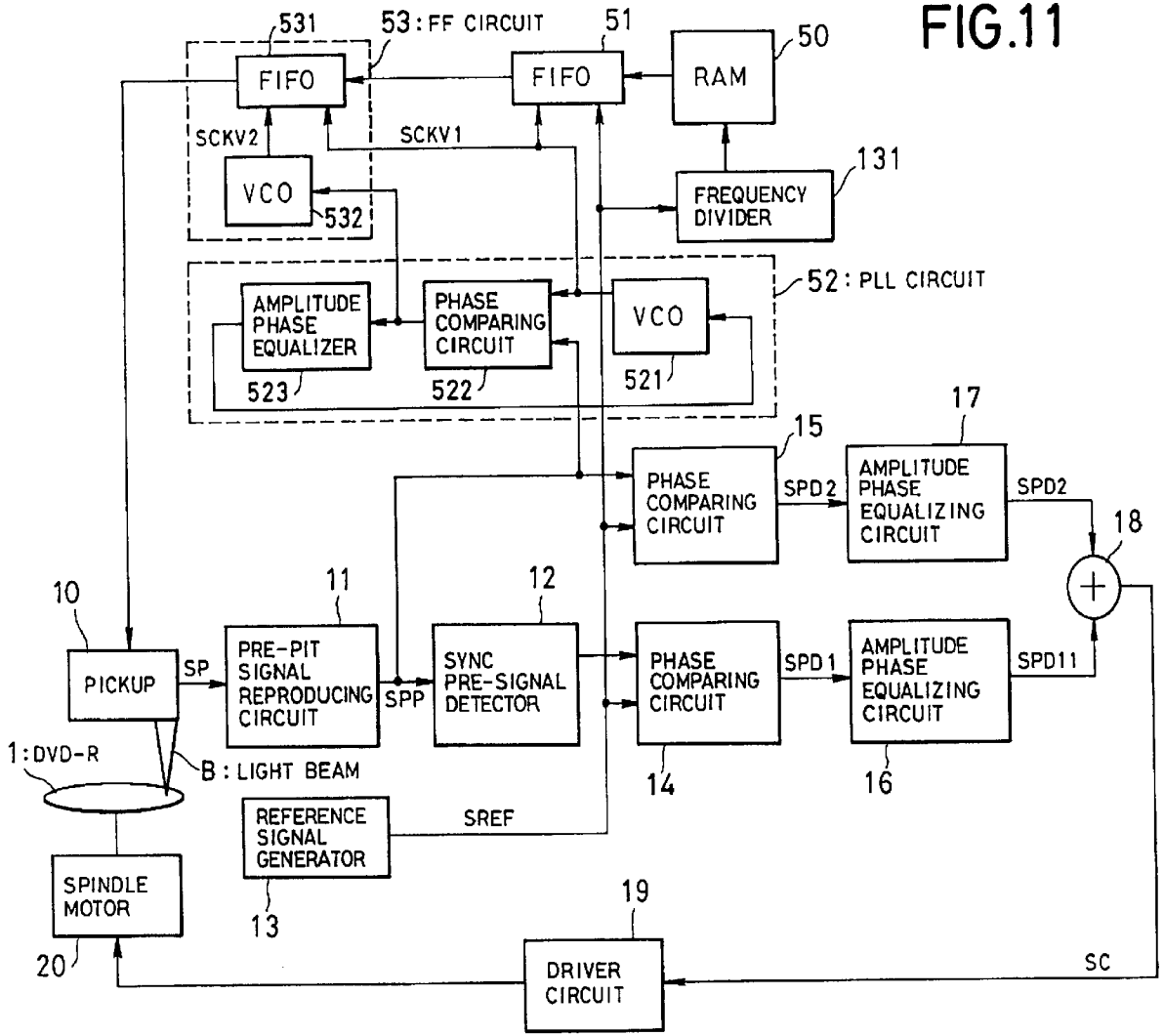
FIG.11
RAM
50
FIFO
51
FREQUENCY DIVIDER
131
53 : FF CIRCUIT
FIFO
531
VCO
532
SCKV1
SCKV2
52 : PLL CIRCUIT
VCO
521
PHASE COMPARING CIRCUIT
522
AMPLITUDE PHASE EQUALIZER
523
PHASE COMPARING CIRCUIT
15
SPD2
AMPLITUDE PHASE EQUALIZING CIRCUIT
17
SPD2
18
AMPLITUDE PHASE EQUALIZING CIRCUIT
16
SPD1
SPD11
PHASE COMPARING CIRCUIT
14
SYNC PRE-SIGNAL DETECTOR
12
SPP
PRE-PIT SIGNAL REPRODUCING CIRCUIT
11
SP
PICKUP
10
B : LIGHT BEAM
1 : DVD-R
REFERENCE SIGNAL GENERATOR
13
SREF
DRIVER CIRCUIT
19
SC
SPINDLE MOTOR
20

PHASE COMPARING CIRCUIT 522

ROTATION CONTROL APPARATUS OPERATING WITH A SYNC SIGNAL HAVING VARIABLE INTERVALS

Matter enclosed in heavy brackets [ ] appears in the original patent but forms no part of this reissue specification; matter printed in italics indicates the additions made by reissue.

*More than one reissue application has been filed for the reissue of U.S. Pat. No. 5,920,530, issued on Jul. 6, 1999, and which is a continuation of U.S. application Ser. No. 08/816,138, filed on Mar. 12, 1997 and issued as U.S. Pat. No. 5,875,163. The reissue applications are U.S. application Ser. No. 09/899,104, filed Jul. 6, 2001 (the present reissue application) and U.S. application Ser. No. 10/617,395, filed on Jul. 11, 2003, all of which are divisional reissues of U.S. Pat. No. 5,920,530.*

This is a continuation of application Ser. No. 08/816,138 filed Mar. 12, 1997, now U.S. Pat. No. 5,875,163, the disclosure of which is incorporated herein by reference.

BACKGROUND OF THE INVENTION

1. Field of the Invention

The present invention relates to a rotation control apparatus for controlling a rotating state of a motor such as a spindle motor for rotating an optical disk or the like.

2. Description of Background Information

Hitherto, rotation control of a motor such as a spindle motor has been performed by using a sync signal (synchronization signal) recorded on an optical disk, for example, at predetermined intervals together with information data to be reproduced, so that the sync signal corresponds to such information data. The sync signal is detected, and the periodic intervals at which the sync signal is detected are compared with a reference signal having a predetermined constant period (the period is set at a value at which the recorded information is reproduced in the best state when the optical disk or the like is rotated according to that period). The rotational speed of the motor is controlled so that a difference between them is equal to zero, namely, the period of the sync signal detected coincides with the period of the reference signal.

In conventional rotation control apparatuses briefly described above, it is however a prerequisite that the sync signal is recorded at predetermined constant intervals (period). In the case of an optical disk or the like having such a structure wherein parts of the sync signal are recorded at intervals different from those of the other sync signal parts, with the conventional rotation control apparatus and phase sync circuit, it is impossible to maintain an accurate rotating state such as the CLV (Constant Linear Velocity) or CAV (Constant Angular Velocity) type rotation.

More particularly, if the conventional rotation control apparatus is applied to the optical disk or the like such that parts of the sync signal are recorded at an interval corresponding to a period different from the period of the other sync signal parts, even the interval of the sync signal parts different from the intervals of the other sync signal parts is also controlled so as to be matched with the period (corresponding to the intervals of the other sync signal parts) of the reference signal. When the portion where the interval of the sync signal parts is different from the intervals of the other sync signal parts is detected, therefore, the rotational speed is deviated (being faster or delayed) from the rotational speed to be obtained by a value corresponding to the difference between the intervals of the sync signal. Namely, there arises a problem that the operation to control the rotation at the period of the reference signal contrarily causes a fluctuation of the rotation.

OBJECT AND SUMMARY OF THE INVENTION

The invention, therefore, has been made in consideration of the foregoing problems and it is an object of the invention to provide a rotation control apparatus which can maintain an accurate rotating state even in an information recording medium wherein a part of the sync signal is recorded at an interval different from those of the other sync signal parts.

To accomplish the above objects, according to the first aspect of the invention there is provided a rotation control apparatus for controlling a rotation of an information recording medium having pre-pits which are formed at periodic intervals having a period that is m (m is an integer) times a unit period in accordance with pre-information to be recorded and are recorded at positions that are deviated from the periodic intervals by an interval that is k (k is an integer smaller than m (k<m)) times the unit period depending on recording positions of the pre-pits, comprising: a unit period signal generator which generates a unit period signal having the unit period; a pre-pit detector which detects the pre-pits from the recording medium; phase difference detector which detects a phase difference between a detection timing of the pre-pits and the unit period signal and generating a phase difference signal; a holding circuit for holding the phase difference signal; a rotation control device which receives said phase difference signal, wherein the rotation of the recording medium is controlled on the basis of the phase difference signal held by the holding circuit.

According to the first aspect of the invention, the unit period signal generator generates the unit period signal having a unit period that is a fraction (by the division by an integer number) of the period of intervals at which the pre-pits constituted by a sync pre-signal and a data pre-signal are recorded, and supplies the unit period signal to the phase comparator.

In parallel with the above operation, the pre-pit detector detects the pre-pits from the recording medium and supplies a detection signal indicating the detection of the pre-pits to the phase comparator.

The phase comparator executes a phase comparison with the unit period signal at timings when the detection signal is supplied, thereby generating a phase difference signal indicative of a fluctuation amount in the unit period of the detection timing of the pre-pit.

The holding circuit holds the phase difference signal which is supplied from the phase comparator until a next phase difference signal is supplied.

On the basis of the phase difference signal being held by the holding circuit, the phase difference is set off and the rotation of the motor is controlled so as to put it into a predetermined rotating state.

Thus, the rotation of-the motor is controlled in such a way that a phase difference for the unit period as a period of a fraction of the period of the intervals of the pre-pits is compared at detection timings of pre-pits, and the control of the motor rotation is effected to set off the phase difference. Even when the pre-pits are not derived at predetermined periodic intervals, therefore, a predetermined rotational state can be accurately obtained.

To accomplish the objects described, the second aspect of the invention features that, in the rotation control apparatus according to the first aspect of the invention, the unit period signal generator generates a monotonous increasing signal having the unit period, and the phase difference detector detects the phase difference on the basis of an amplitude value of the monotonous increasing signal at the detection timings of the pre-pits.

To accomplish the above objects, according to the third aspect of the invention there is provided a rotation control apparatus for controlling a rotation of an information recording medium having pre-pits constituted by sync pits which are formed at first periodic intervals having a period in relation to the unit period such that it is m (m is an integer) times a unit period and are recorded at positions that are deviated from the first period interval by an interval that is k (k is an integer; k<m) times the unit period depending on recording positions, and information pits which are recorded at second periodic intervals having a period which is smaller than the period of the first periodic intervals and is in relation to the unit period such that it is n times the unit period in accordance with pre-information to be recorded, comprising: a unit period signal generator which generates a unit period signal having the unit period; a pre-pit detector which detects the pre-pits from the recording medium; a sync pit detector which detects the sync pits from the pre-pits; a first phase difference detector which detects a phase difference between detection timings of the sync pits and the unit period signal; a second phase difference detector which detects a phase difference between the detection timings of the pre-pits and the unit period signal and generates a first phase difference signal; a first holding circuit which holds the first phase difference signal which is generated from the first phase difference detector; a second holding circuit which holds the second phase difference signal which is generated from the second phase difference detector; and an adder which adds the first and second phase difference signals held at the first holding circuit and the second holding circuit, and a rotation control device which receives an output signal of the adder, wherein the rotation of the recording medium is controlled on the basis of an output signal of the adder.

According to the third aspect of the invention, the unit period signal generator generates the unit period signal having the unit period which is a fraction of the period of the intervals at which the pre-pits constituted by the sync pre-signals and data pre-signals are recorded and supplies the unit period signal to the first and second phase comparator.

In parallel with the above operation, the pre-pit detector detects the pre-pit from the recording medium and supplies a detection signal notifying the detection of the pre-pit to the second phase comparator.

The sync pit detector detects the sync pits from the pre-pits and supplies a detection signal notifying the detection of the sync pit to the first comparator.

The first phase comparator performs a phase comparison with the unit period signal at the detection timings of the sync pits and generates a first phase difference signal indicative of a fluctuation amount in the unit period of the detection timings of the sync pits.

The first holding circuit holds the first phase difference signal which is supplied from the first phase comparator until a next phase difference signal is supplied, and supplies the phase difference signal being held to the adder.

The second holding circuit holds the second phase difference signal which is supplied from the second phase comparator until a next phase difference signal is supplied and supplies the phase difference signal held to the adder.

The adder generates an addition phase difference signal in which the first and second phase difference signals being supplied are added.

On the basis of the addition phase difference signal which is supplied from the adder, the phase difference is set off and the motor rotation is controlled so as to enter a predetermined rotating state.

Thus, a coarse phase difference signal is obtained by comparing the phase difference for the unit period as a period that is a fraction of the period of the intervals of the sync pits at a detection timing of the sync pits which are detected at relatively coarse intervals, a fine phase difference signal is obtained by comparing the phase difference for the unit period as a period which is a fraction of the period of the intervals of the pre-pits at detection timings of the pre-pits which are detected at relatively dense intervals comprising the sync pre-signals and data pre-signals, and an addition phase difference signal is produced by adding the coarse phase difference signal and the fine phase difference signal. The motor rotation is controlled so as to set off those phase differences. Therefore, even when no pre-pit is derived at predetermined periodic intervals, a predetermined rotating state can be accurately obtained and as compared with the rotation control performed by using the sync pits only, so that a rotation control of a higher precision can be executed.

BRIEF DESCRIPTION OF THE DRAWINGS

FIGS. 9A to 9F are waveform diagrams in each block of the phase comparing circuit 14 in the embodiment;

FIGS. 10A to 10F are waveform diagrams in each block of the phase comparing circuit 15 in the embodiment;

FIG. 11 is a block diagram showing a schematic construction of an information recording apparatus using the rotation control apparatus in the embodiment.

DETAILED DESCRIPTION OF THE PREFERRED EMBODIMENT

A preferred embodiment of the invention will now be described with reference to the drawings.

Explanation will be made below to an embodiment in the case of applying the invention to a DVD-R of writable WO (Write Once) type among high density optical disks (hereinafter, referred to as a DVD) which are progressively being developed in recent years and in which a recording density can be tremendously improved as compared with the conventional CD (Compact Disc), so that an entire length of a movie or the like can be recorded on one optical disk.

(1) Construction of DVD-R

Prior to explaining a specific embodiment corresponding to the invention, an outline of the DVD-R to which the embodiment is applied will be first described with reference to FIGS. 1 and 2.

Generally, in a WO-type optical disk or the like, pre-information to retrieve a position when writing recording information is preliminarily recorded on the optical disk or the like at a pre-formatting stage of manufacturing of the optical disk. Address information indicative of a write position of recording information on the optical disk or the like are included in the pre-information.

In the WO-type optical disk, generally, groove tracks for recording information and land tracks for guiding an irradiating position of a light beam for recording information to the groove track are formed on an information recording surface. In the DVD-R, however, the pre-information is recorded by forming pre-pits onto the land tracks by using a cutting apparatus, for example.

A specific example of the structure of DVD-R will now be described with reference to FIG. 1.

Figure 1:
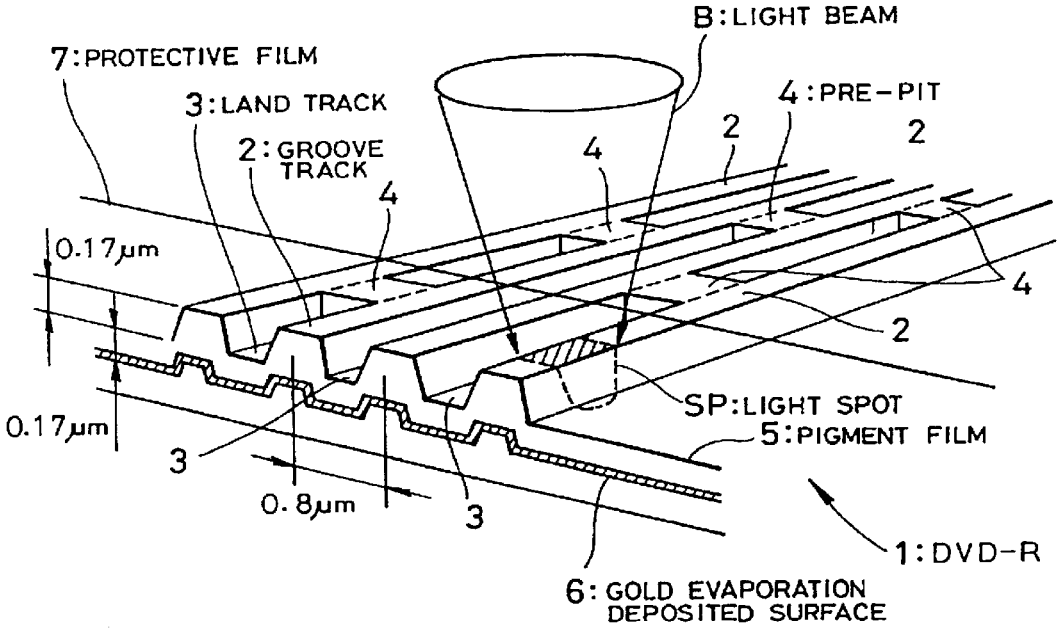
FIG. 1 is a perspective view showing an example of a DVD-R in which pre-pits are formed on land tracks.

As shown in FIG. 1, a DVD-R 1 is a pigment type DVD-R which has a pigment film 5 and in which information can be written only once. Groove tracks 2 and land tracks 3 for guiding a light beam B as reproducing light or recording light to the groove track 2 are formed on the DVD-R by a cutting apparatus or the like. The DVD-R 1 also has a protective film 7 to protect those tracks and a gold evaporation deposited film 6 to reflect the light beam B when reproducing the recorded information. Pre-pits 4 corresponding to the pre-information are formed on the land tracks 3 by the cutting apparatus or the like. The pre-pits 4 are previously formed before shipping of the DVD-R 1.

When recording information data (information data other than the pre-information, such as image information to be recorded) is recorded to the DVD-R 1 in a predetermined information recording apparatus, the pre-information is previously acquired by detecting the pre-pits 4. Based on the pre-information, the rotational speed (in the case of the DVD-R 1, what is called a CLV rotation is performed) of the DVD-R 1 is set, and address data corresponding to the recording information is acquired, so that the recording information is recorded at a corresponding recording position on the DVD-R 1 based on the address information.

For recording the recording information, the light beam B is irradiated so that its center is on the center of the groove track 2 and a recording information pit corresponding to the recording information is formed on the groove track 2, thereby forming the recording information. In this scheme, as shown in FIG. 1, the size of the light spot SP is set so that a part of the light spot SP is irradiated onto not only the groove track 2 but also the land track 3. By using a partial reflection light of the light spot SP irradiated to the land track 3, the pre-information is detected from the pre-pit 4 prior to the recording of the recording information by a tangential push-pull method, which will be explained hereinafter.

Recording format of the pre-information in the DVD-R 1 will now be described with reference to FIG. 2.

Figure 2:
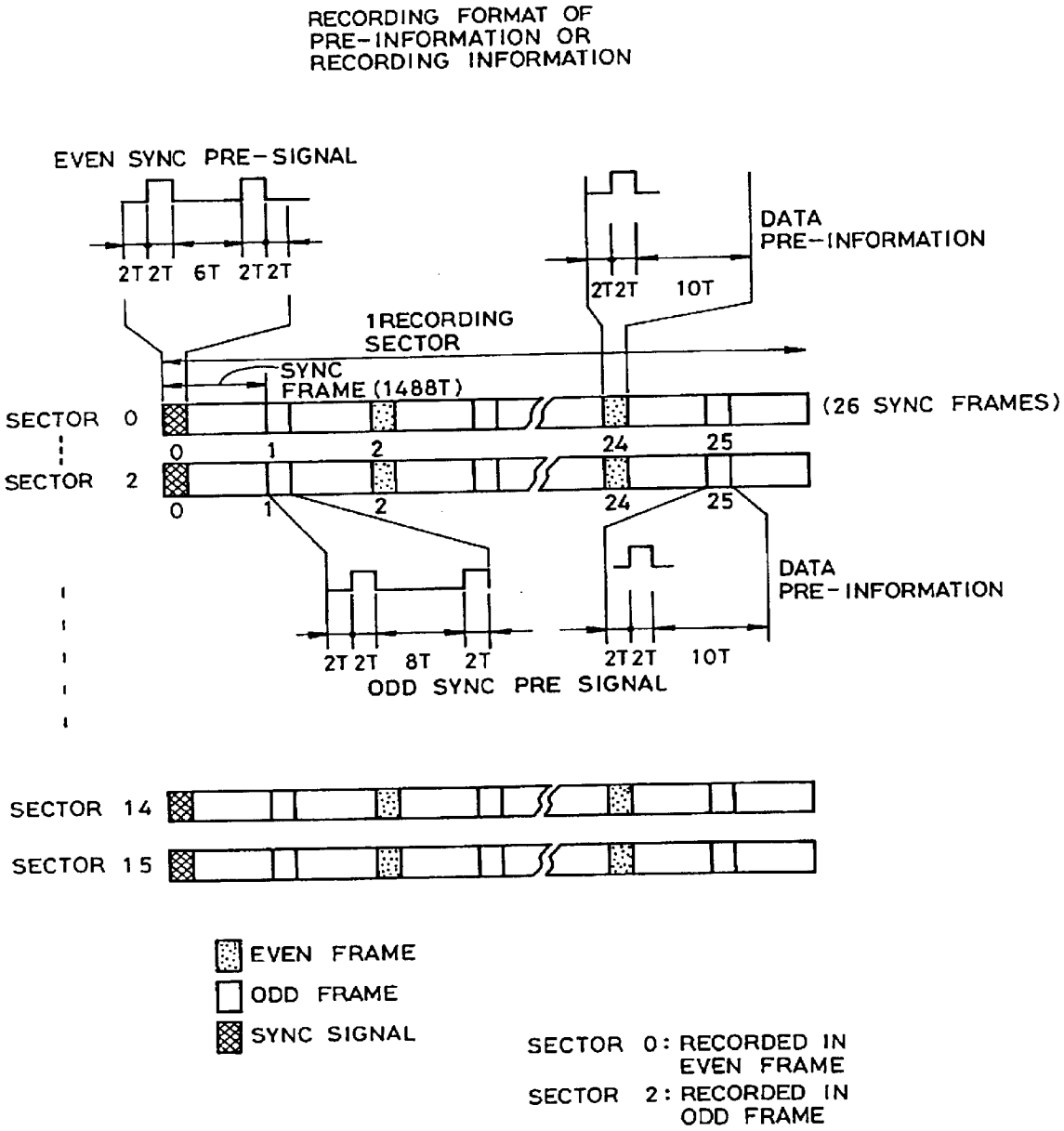
FIG. 2 is a diagram showing a recording format of pre-information or recording information.

As shown in FIG. 2, the pre-information in the DVD-R 1 is recorded every sync frame. Further, one record sector is formed by 26 sync frames. One ECC (Error Correcting Code) block is formed by 16 recording sectors. Further, one sync frame has a length which is 1488 times (1488 T) a unit length (hereinafter, simply referred to as "T") corresponding to a bit interval that is specified by the recording format used for recording the recording information. In the embodiment, a sync frame period having the length of 1488 T is hereinafter referred to as a unit period. In the case of the recording format shown in FIG. 2, a plurality of recording sectors is continuously recorded on one land track 3.

The pre-information is recorded in a portion of a length of 14 T in the head part of the sync frame from a position of 2 T from the start position of each sync frame. In this step, however, in one recording sector the predetermined a recorded in only the even-number sync frames (hereinafter, referred to a EVEN frames) odd-number designated sync frames (hereinafter, referred to as ODD frames) being designated. The pre-information to be recorded is classified into a sync pre-signal corresponding to the sync signal in the pre-information and data pre-information. The sync pre-signal in those signals, however, is recorded at the position of the sync frame in the head of each recording sector among the sync frame positions where the pre-information should be recorded. The sync pre-signal (EVEN sync pre-signal) which is recorded in the EVEN frame and the sync pre-signal (ODD sync pre-signal) which is recorded in the ODD frame are recorded to have different patterns as shown in FIG. 2. Specifically, the EVEN sync pre signal is constituted by two parts having a length of 2 T spaced apart by 6 T, and the ODD sync pre signal is constituted by two parts having a length of 2 T spaced apart by 8 T. By reading them when recording the recording information, whether the pre-information is recorded in the EVEN frame or the ODD frame can be distinguished.

As mentioned above, the pre-information is distributed and recorded in 14 T at the head of the sync frame in the EVEN frame or the ODD frame. This is because in the case of the manufacture of the DVD-R 1, if the pre-pits 4 are formed to be concentrated on one position, the following problem arises. Namely, when a material constructing the pigment film 5 is coated by a spin coating or the like, in this portion the material flows into the pre-pits 4 which were previously formed and the pigment film 5 of a predetermined thickness upon designing is not formed on the groove track 2 (when the pigment film 5 of the predetermined thickness is not formed, a problem such that a DC component changes or the like occurs at the time of reproduction of the recorded information).

On the other hand, the data pre-information is distributed and recorded into a plurality of sync frames. In one sync frame, as shown in FIG. 2, only the data pre-information corresponding to "1" is recorded at a position of 2 T from the start position of each sync frame so as to have a length of 2 T. The data pre-information corresponding to "0", therefore, is not formed as a pre-pit.

FIG. 2 shows a state in which, for instance, the pre-information is recorded in the EVEN frame in a recording sector 0 and the pre-information is recorded in the ODD frame in a recording sector 2.

The recording information, further, which is recorded by the information recording apparatus on the basis of the detected pre-information is also recorded by a format similar to the recording format shown in FIG. 2. In this instance, in recording the recording information, although the sync signal of a length of 14 T is recorded at the heads of all of the sync frames and data such as image information and the like to be recorded is recorded at positions other than 14 T at the head of one sync frame, no information is recorded at the positions other than 14 T at the head in one sync frame in recording the pre-information.

In the DVD-R 1 as mentioned above, the pre-information is recorded in only the EVEN frame or ODD frame and the sync pre-signal in the pre-information is recorded at the position of the EVEN frame or the position of the ODD frame at the head of each recording sector. Therefore, so long as this information is detected upon recording of the recording information, when the recording position of the pre-information changes from the EVEN frame to the ODD frame or from the ODD frame to the EVEN frame, the period of the sync pre-signals to be detected changes as compared with cases where only the EVEN frames or the ODD frames are continuously detected.

Figure 3:
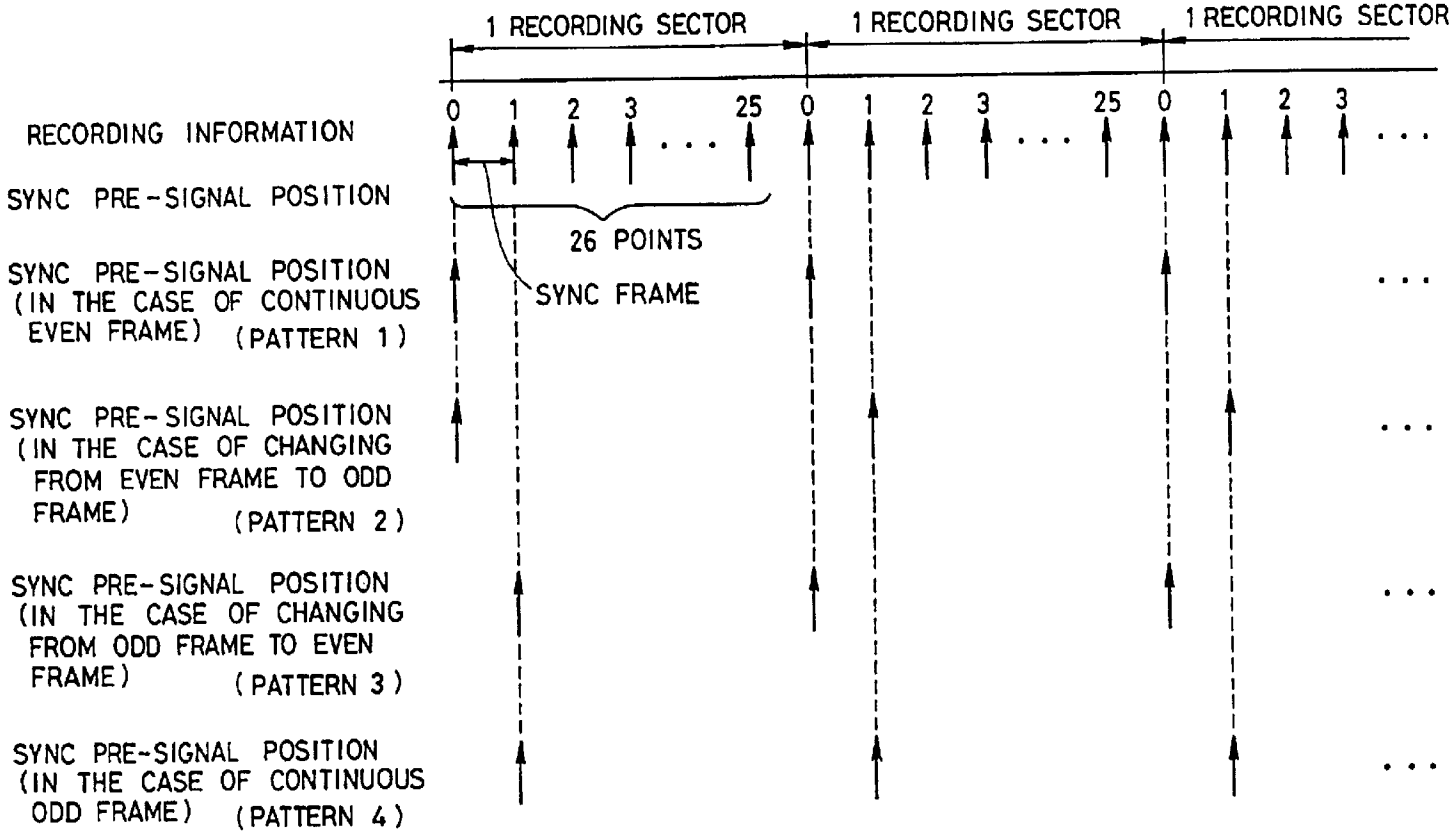
FIG. 3 is a diagram showing a detection pattern of a sync pre-signal.

Specifically, as shown in FIG. 3, when the EVEN frame continues (hereinafter, referred to as a pattern 1) or the ODD frame continues (hereinafter, referred to as a pattern 4), the sync pre-signal is accurately detected with the interval of one recording sector. In case of a change from the EVEN frame to the ODD frame (hereinafter, referred to as a pattern 2), the interval of the sync pre-signals at the time of the change becomes longer than the interval of one recording sector by the length of one sync frame. In case of change from the ODD frame to the EVEN frame (hereinafter, referred to as a pattern 3), the interval of the sync pre-signals at the time of the change becomes shorter than the interval of one recording sector by the length of one sync frame. Even in case of the pattern 2 or 3, after completion of each change, the period of the sync pre-signals returns to the length of one recording sector.

Even in the DVD-R 1 in which the parts of the sync pre-signals are recorded at intervals different from the intervals of the other sync pre-signals as described above, the accurate CLV rotation can be maintained according to the invention by the scheme described below.

(2) Embodiment

The embodiment of the present invention will now be described with reference to FIGS. 4 and 5.

A whole construction of a rotation control apparatus according to the embodiment will be first described with reference to FIG. 4. FIG. 4 shows only a portion regarding the rotation control apparatus of the embodiment in the construction of an information recording apparatus for recording the recording information to the DVD-R 1. Since the construction of the other portions of the information recording apparatus such as encoding of the recording information, focusing servo and tracking servo for the light beam B, and the like is similar to the construction of the prior art, it is not shown and its detailed description will not be repeated.

Figure 4:
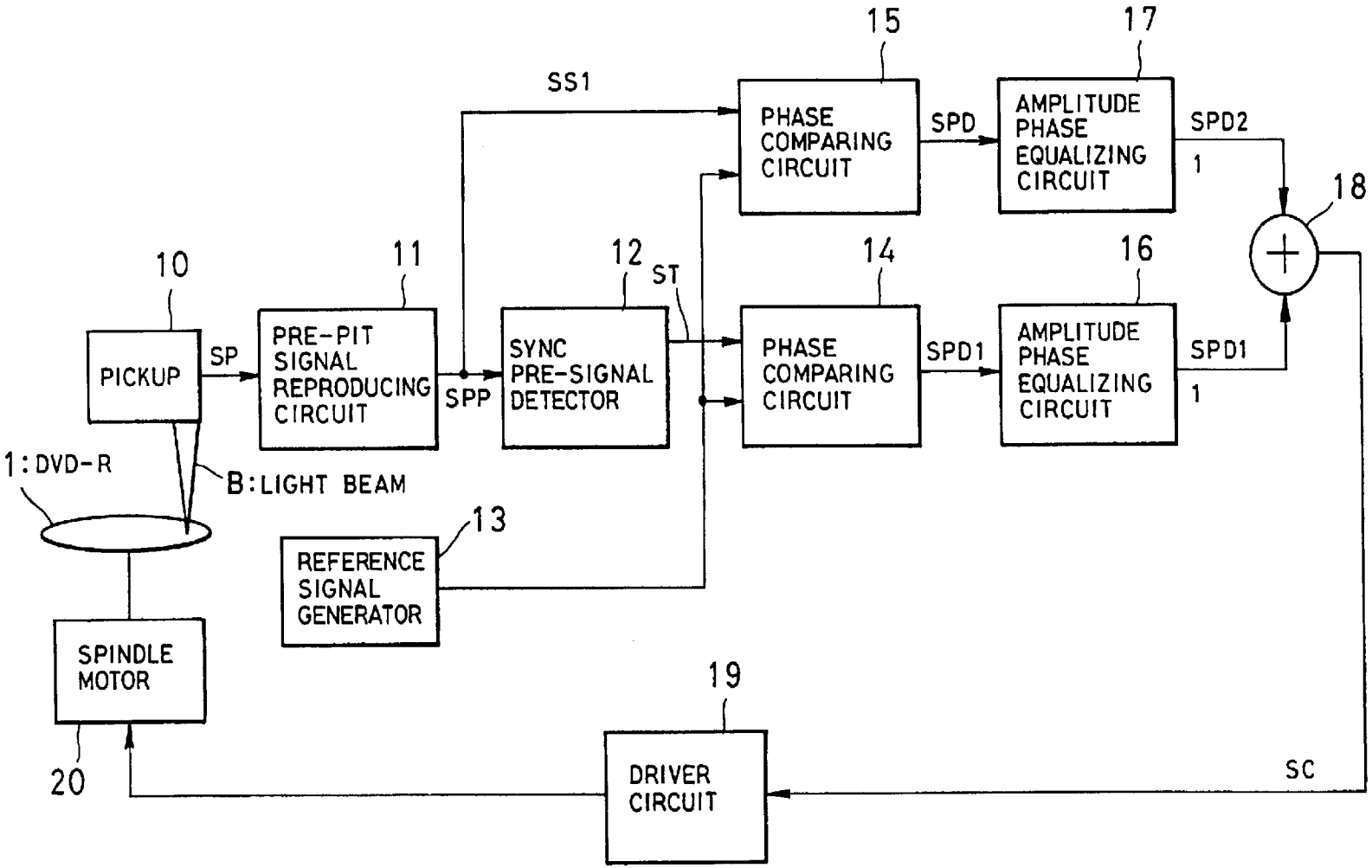
FIG. 4 is a block diagram showing a schematic construction of a rotation control apparatus according to an embodiment.

As shown in FIG. 4, a rotation control apparatus SS1 in the embodiment is constituted by: a pickup 10 which includes a laser diode (not shown) and an objective lens, a beam splitter, a photodetector, and the like, which will be explained hereinafter, and is used for irradiating the light beam B as a recording light to the DVD-R 1 on which the pre-information has been recorded by forming the pre-pits 4, receiving a reflection light from the pre-pits 4, and generating a detection signal SP to detect the pre-information by a tangential push-pull method; a pre-pit signal reproducing circuit 11 for generating a reproduction signal SPP as pre-information corresponding to the pre-pit 4 from the detection signal SP; a sync pre-signal detector 12 for separating and detecting the system pre-signal from the reproduction signal SPP, and generating a timing signal ST corresponding to timings at which the sync pre-signal is detected; a reference signal generator 13 for generating a period signal (reference signal) of the unit length T corresponding to the bit interval of the recording information; a phase comparing circuit 14 serving as first phase comparator which forms a unit period signal corresponding to the sync frame period (1488 T) from the reference signal supplied from the reference signal generator 13, compares phases of the unit period signal and the timing signal ST supplied from the sync pre-signal detector 12, and generates a phase difference signal SPD1; a phase comparing circuit 15 serving as second phase comparator which similarly compares phases of the unit period signal and the reproduction signal SPP supplied from the pre-pit signal reproducing circuit 11 and generates a phase difference signal SPD2; an amplitude phase equalizing circuit 16 for specifying the output signal SPD1 from the phase comparing circuit 14 so as to have desired gain and phase characteristics of a rotation control system; an amplitude phase equalizing circuit 17 for similarly specifying the output signal SPD2 from the phase comparing circuit 15 so as to have desired gain and phase characteristics; an adding circuit 18 for adding the output signals SPD1 and SPD2 from the amplitude phase equalizing circuits 16 and 17 and generating a rotation control signal SC; and a driver circuit 19 for converting the rotation control signal SC which is supplied from the adding circuit 18 into a current signal and supplying to a motor 20.

The operation of the whole apparatus will now be described.

The pre-information detected and reproduced from the DVD-R 1 by the pickup 10 and pre-pit signal reproducing circuit 11 is supplied as a reproduction signal SPP to the sync pre-signal detector 12 and phase comparing circuit 15. The sync pre-signal is detected in the sync pre-signal detector 12 and the timing signal ST corresponding to the sync pre-signal is generated. In the phase comparing circuit 15, a phase comparison, which will be explained hereinafter, between the reference signal and the supplied reproduction signal SPP is executed and a comparison results is supplied as a fine error signal SPD2 for rotation control to the adding circuit 18 through the amplitude phase equalizing circuit 17. The timing signal ST generated from the sync pre-signal detector 12 is supplied to the phase comparing circuit 14 and a phase comparison, which will be explained hereinafter, between the reference signal and the timing signal ST is executed. A comparison result is supplied as a coarse error signal SPD1 for rotation control to the adding circuit 18 through the amplitude phase equalizing circuit 16.

The adding circuit 18 adds the coarse error signal SPD1 and fine error signal SPD2 and forms the rotation control signal SC. The rotation control signal SC is supplied to the spindle motor 20 through the driver circuit 19.

The detection of the pre-information by the tangential push-pull method mentioned above will now be described together with the detailed construction of the pickup 10 and pre-pit signal reproducing circuit 11 with reference to FIG. 5 and FIGS. 6A through 6D.

The detection by the tangential push-pull method denotes a detection using a push-pull method in the rotating direction of the DVD-R 1 and relates to a method whereby the reflection light from the light spot SP by the light beam B formed on the land track 3 of the DVD-R 1 enters a photodetector having two divided detector parts bounded by a dividing line which is optically perpendicular to the moving direction (rotating direction of the disk) of the pre-pit 4 and the pre-information is reproduced on the basis of a difference signal from the photoconductor which is obtained as a difference between detection signals of the two detector parts.

Figure 5:
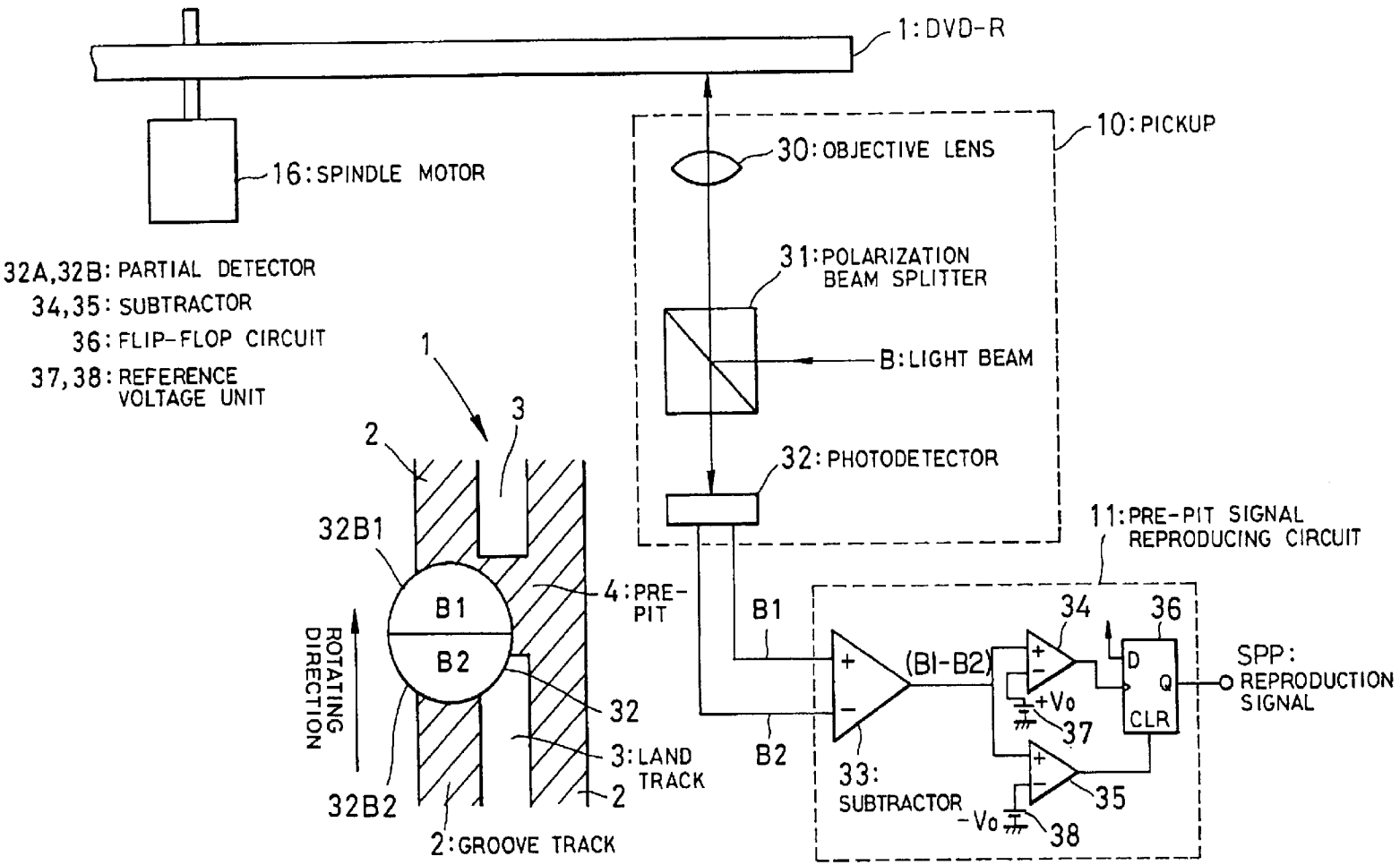
FIG. 5 is a block diagram showing a schematic construction of a pickup and a pre-pit signal reproducing circuit of the embodiment.

Namely, more specifically speaking, as shown in FIG. 5, the light beam B as a recording light (it becomes a reproducing light for the pre-pit 4) formed by a laser diode or the like (not shown) is reflected by a polarization beam splitter 31 and is converged by an objective lens 30 onto the groove track 2 and land track 3 of the DVD-R 1 (refer to FIG. 1). The reflection light of the light beam B which was modulated by the pre-pit 4 and in which the plane of polarization was rotated by the reflection by the DVD-R 1 passes through the polarization beam splitter 31 by the rotation of the plane of polarization and is irradiated onto the photosensitive surfaces of a photodetector 32 divided into two detector parts 32A and 32B bounded by the dividing line which is optically perpendicular to the rotating direction of the DVD-R 1 and is detected. Photo sensing outputs of the detector parts 32A and 32B (in the subsequent description, outputs of the two detector parts are denoted by B1 and B2) are subjected to a subtraction by a subtracter 33 forming part of the pre-pit signal reproducing circuit 11. A difference signal (B1–B2) from the subtracter 33 is compared with reference voltages +VO and −VO which are supplied from reference voltage units 37 and 38 by subtracters 34 and 35, respectively. Outputs of the subtracters 34 and 35 are supplied to a flip-flop circuit 36, respectively. An output of the flip-flop 36 is transmitted as a reproduction signal (pre-pit information) SPP to the sync pre-signal detector 12 and phase comparing circuit 15.

The generation of a difference signal (tangential push-pull signal) (B1–B2) and reproduction signal SPP by the photodetector 32 and pre-pit signal reproducing circuit 11 will now be described with reference to FIGS. 6A through 6B.

Figure 6A:
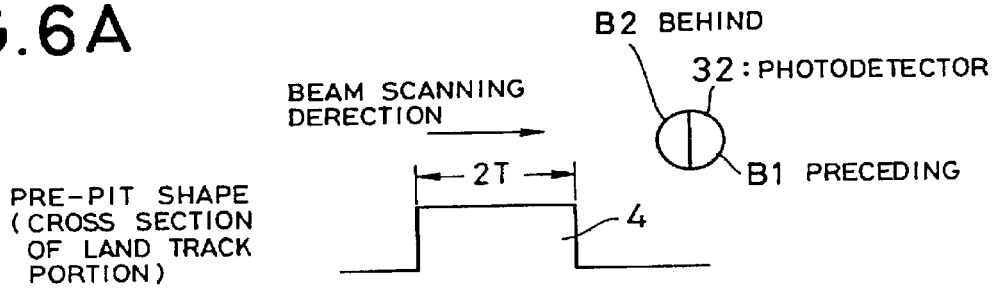
FIGS. 6A through 6D are diagrams for explaining the formation of a tangential push-pull signal.
Figure 6B:
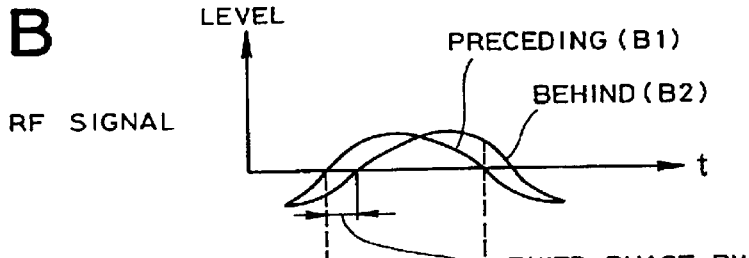
Figure 6C:
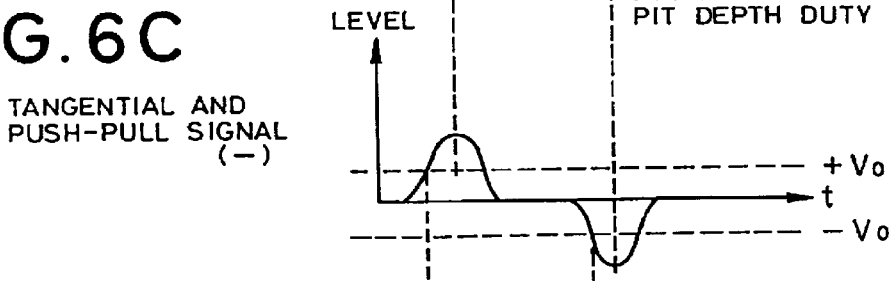
Figure 6D:
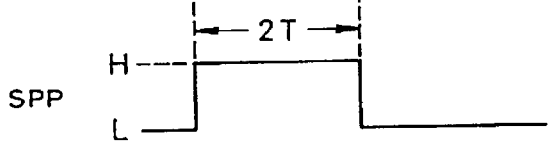

In FIG. 6A, when the reflection light from the pre-pit 4 of a shape showing a cross sectional view in the rotating direction of the DVD-R 1 is received by the photodetector 32, the photo sensing outputs of the partial detectors 32A and 32B are generated from the partial detectors 32A and 32B as RF (Radio Frequency) signals (B1 and B2) whose phases are deviated as shown in FIG. 6B on the basis of a positional deviation of the partial detectors, respectively. By obtaining a difference between the RF signals by the subtractor 33, a difference signal (tangential push-pull signal) (B1–B2) shown in FIG. 6C is formed. The difference signal is supplied to the subtractors 34 and 35 and is compared with the reference voltages $+V_0$ and $-V_0$, respectively. By making the flip-flop circuit 36 operative by using comparison results, the reproduction signal SPP shown in FIG. 6D is formed. Thus, the pre-information (including the sync pre-signal and data pre-information) included in the reproduction signal SPP is generated to the sync pre-signal detector 12 and phase comparator 15.

The phase comparator operations in the phase comparing circuits 14 and 15 will now be described with reference to FIG. 7 to FIG. 10F.

Constructions of the phase comprising circuits 14 and 15 will be first described with reference to FIGS. 7 and 8.

Figure 7:
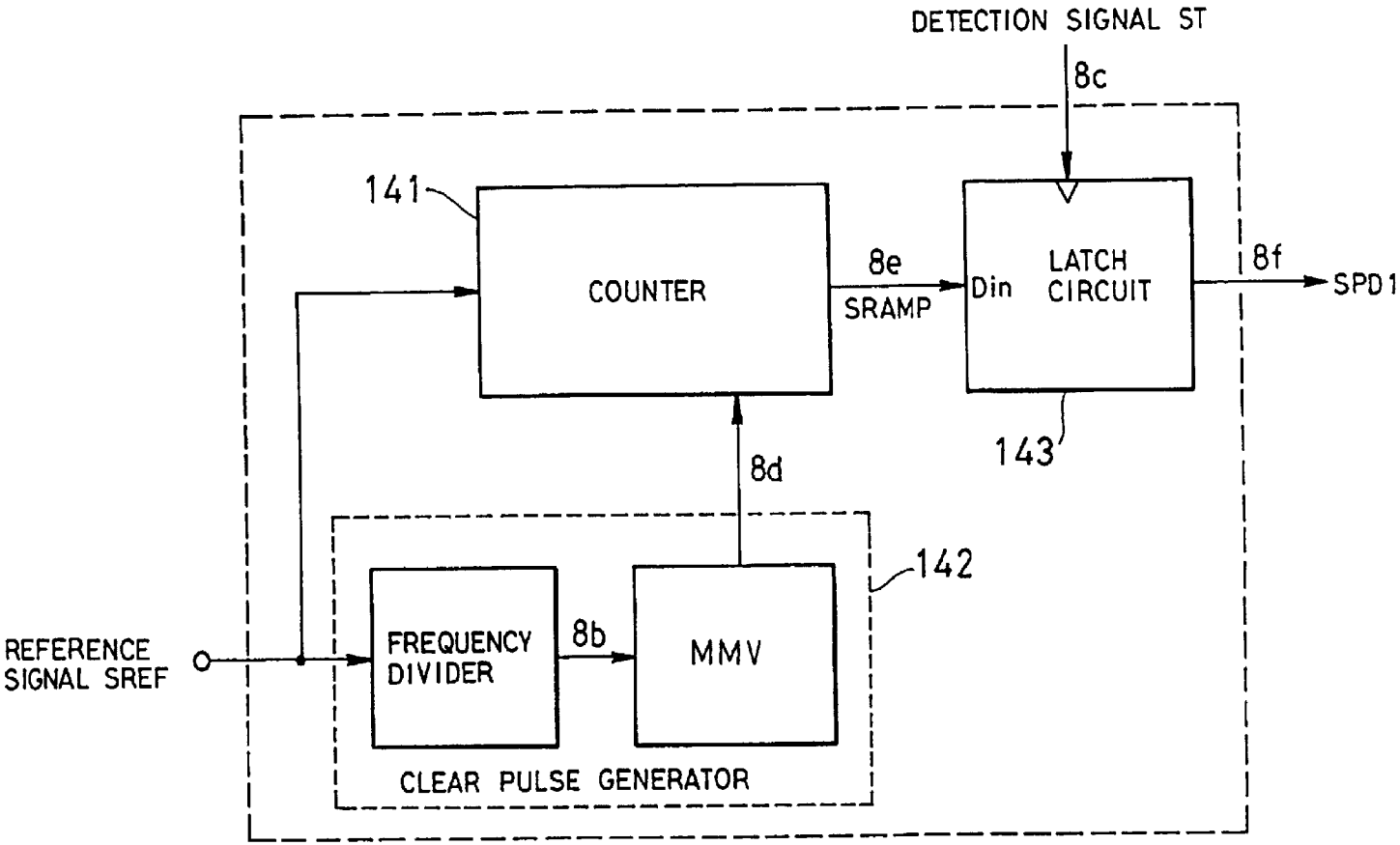
FIG. 7 is a block diagram showing a construction of a phase comparing circuit 14 in the embodiment.

As shown in FIG. 7, the phase comparing circuit 14 is constituted by: a counter 141 for counting a reference signal pulse SREF of a unit length T corresponding to a bit interval of the recording information from the reference signal generator 13; a clear pulse generator 1432 for frequency dividing the reference signals into 1/744 and generating a clear pulse signal at an interval of a sync frame period (1488 T); and a latch circuit 143 for latching a count value which is generated from the counter 141 at a timing when the detection signal ST of the sync pre-signal is generated from the sync pre-signal detector 12.

Figure 8:
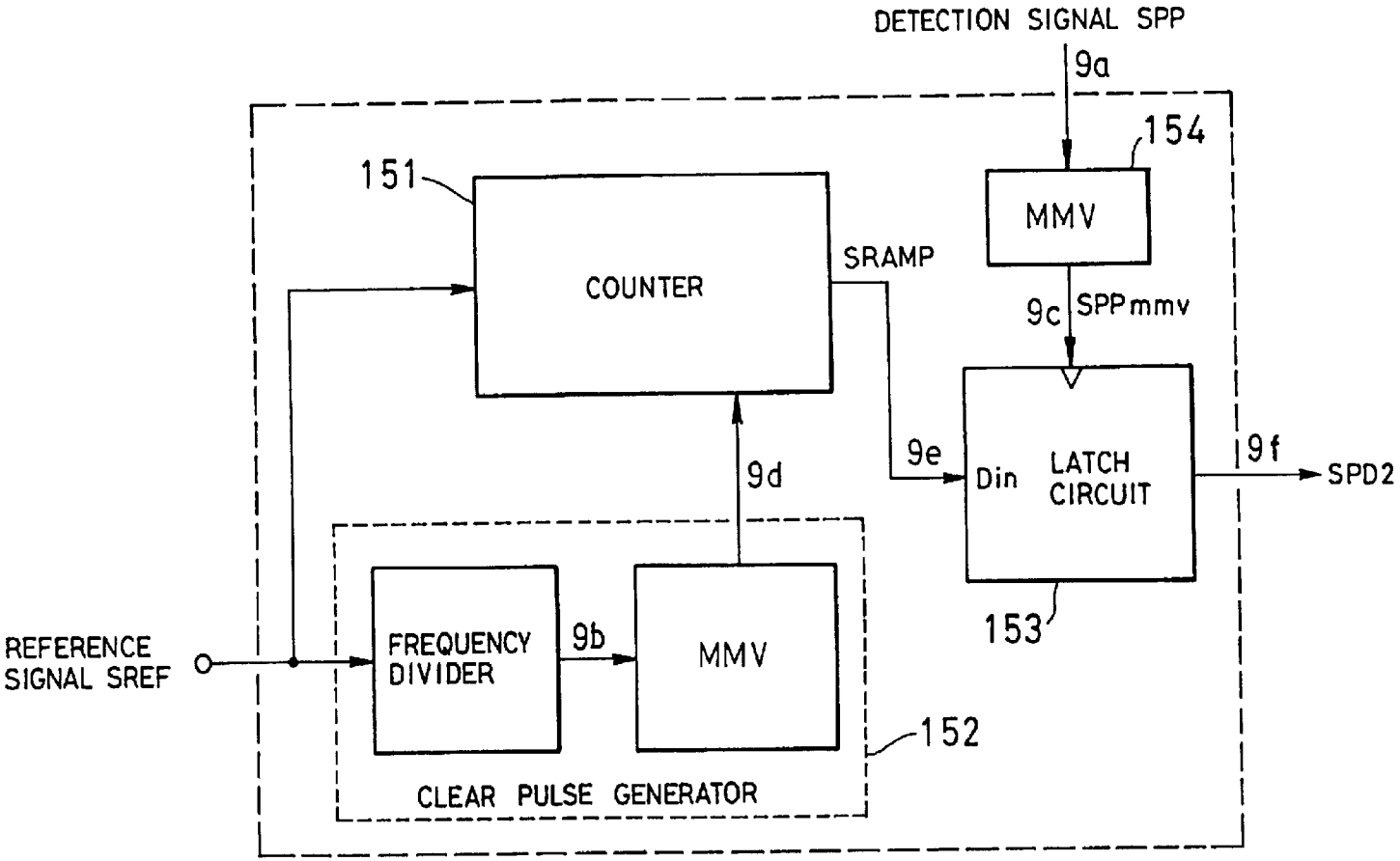
FIG. 8 is a block diagram showing a construction of a phase comparing circuit 15 in the embodiment.

As shown in FIG. 8, in the phase comparing circuit 15, a signal to decide a latch timing in a latch circuit 153 is a pulse signal of a predetermined width which is generated synchronously with a leading edge of the timing signal SPP that is generated from the pre-pit signal reproducing circuit 11. The pulse signal is formed by an MMV (Mono Multi Vibrator) 154. The reason why the MMV 154 is interposed is because since the sync pre-signal in the pre-pit reproduction signal SPP has two pulse signals in one sync frame as shown in FIG. 2, if an SRAMP signal is latched by a next pulse signal subsequent to the first pulse signal existing at the position of 2 T from the start of the sync frame, and timing for comparing the phases is deviated from the timing by the other data pre-signal, and the timing deviation is recognized as a disturbance and exerts an influence on the rotation control. To prevent it, a pulse width of pulse signal which is generated from the MMV 154 (it is assumed that the MMV doesn't accept an input pulse signal which arrives for a period of time during which the MMV generates a pulse signal) is set to 8 T or more, thereby masking the next pulse signal subsequent to the first pulse signal of the sync pre-signal. Since the other construction excluding the above construction is the same as that of the phase comparing circuit 14, its description is omitted.

The phase comparing operations which are executed in the above construction will now be described with reference to FIGS. 9A to 9F and FIGS. 10A to 10F. FIGS. 9A to 9F are waveform diagrams in respective blocks of the phase comparing circuit 14 shown in FIG. 7. FIGS. 10A to 10F are waveform diagrams in respective blocks of the phase comparing circuit 15 shown in FIG. 8.

The counter 141 sequentially counts the reference signal pulse SREF which is supplied. The clear pulse generator 142 generates a pulse signal of a predetermined width (FIG. 9D) in accordance with, for instance, a trailing edge of a frequency division signal (FIG. 9B) having a period of 1488 T obtained by frequency dividing the reference signal SREF into 1/744 and supplies it as a clear pulse signal to the counter 141. The counter 141 resets the count value to 0 at the timing when the clear pulse signal is received and restarts the counting operation. As shown in FIG. 9E, therefore, the count value which is generated from the counter 141 becomes the ramp signal SRAMP as a monotonous increasing function having the sync frame period (1488 T) as a unit period in the recording format of the DVD-R 1. The ramp signal SRAMP is supplied to the latch circuit 143 and is latched at a leading timing of the detection signal ST (FIG. 9C) of the sync pre-signal which is supplied from the sync pre-signal detecting circuit 12. Namely, an amplitude level (count value of the counter 141) of the ramp signal at the leading timing of the detection signal ST is used as a sample value is held for a period of time until the next detection signal arrives (FIG. 9F). As shown in FIG. 2, since the sync pre-signal has been recorded from the position of 2 T from the start position of either one of the first and second sync frames of each recording sector irrespective of the EVEN sync pre-signal and the ODD sync pre-signal, the amplitude level of the ramp signal SRAMP of the sync frame period latched at the detection timing of the sync pre-signal includes the phase difference information for the reference signal.

Namely, when the phase of the detection timing (rotation phase of the DVD-R 1) of the sync pre-signal and the phase of the reference signal pulse SREF are matched, as for the ramp signal SRAMP which is formed from the reference signal pulse SREF, a predetermined amplitude level, for example, an intermediate level value (amplitude level at point x in FIG. 9E) is always held at the leading timing of the detection signal ST of the sync pre-signal.

When the detection timing of the sync pre-signal is advanced from the reference signal, a level value (amplitude level at point x−1 in FIG. 9E) smaller than the intermediate level value is held. When the detection timing of the pre-pit is, contrarily, delayed relative to the reference signal, a level value (amplitude level at point x+1 in FIG. 9E) larger than the intermediate value level is held.

The output signal SPD1 from the latch circuit 143 is outputted as a phase error signal.

In the phase comparing circuit 15, a timing signal which is supplied to the latch circuit 153 is a pulse signal SPPmmv (FIG. 10C) formed through the MMV 154 on the basis of the timing signal SPP (FIG. 10A) which is generated from the pre-pit signal reproducing circuit 11. The pre-pit signal is constituted by a sync pre-signal and a data pre-signal. The data pre-signal has been recorded from the position of 2 T from the start position of the sync frame in a manner similar to the sync pre-signal. The amplitude level, therefore, of the ramp signal SRAM (FIG. 10E) of the sync frame period latched at the detection timing of the pre-pit signal includes the phase difference information for the reference signal SREF and is generated as a phase error signal SPD2 (FIG. 10F).

The minimum interval at which the pre-pit signal is detected is equal to a 2-sync frame interval. A phase difference signal (hereinafter, referred to as a fine phase difference signal) which is extracted by the phase comparing circuit 15, accordingly, has a first phase difference component as compared with a phase difference signal (hereinafter, referred to as a coarse phase difference signal) at an almost one recording sector interval which is extracted by the phase comparing circuit 14.

The coarse phase difference signal SPD1 which is formed as mentioned above and is supplied from the phase comparing circuit 14 and the fine phase difference signal SPD2 which is supplied from the phase comparing circuit 15 are added by the adding circuit 18. An addition result is transmitted as a rotation control signal SC to the spindle motor 20. A rotational speed of the motor 20 is controlled in a manner such that intermediate level value of the ramp signal is always maintained at the detection timing of the sync pre-signal and the detection timing of the pre-pit signal.

The above embodiment has been described with respect to the example in which the ramp signal is used as a monotonous increasing function having the unit period. As a monotonous increasing function, however, for instance, like a trapezoidal wave, even by using a waveform signal which monotonously increases only in a range where it is necessary to compare the phase with the detection timing of the pre-pit or a waveform signal which monotonously decreases and which has a waveform that is symmetrical to the ramp signal in the embodiment with respect to the right and left portions, an effect similar to the effect which is obtained by the phase comparing circuits in the embodiment can be expected.

Although the embodiment has been described with respect to the example in which the unit period is set to the sync frame period, a period which is smaller than the sync frame period and has a relation such that it is integer times a period of the interval (in the embodiment, 2-sync frame period) during which the pre-pits exist can be also set to a unit period.

According to the recording format of the pre-information of the DVD-R mentioned above, as shown in FIG. 3, when the sync pre-signal changes from the EVEN frame to the ODD frame (pattern 2) and changes from the ODD frame to the EVEN frame (pattern 3), an interval of the sync pre-signals at the time of the change becomes longer or shorter than the interval of one recording sector by only a length of one sync frame. Even in the case where parts of sync pre-signals are recorded at an interval different from that of the other sync pre-signals, according to the phase comparing circuit in the embodiment, the phase error signal can be accurately extracted without being influenced by the change in recording interval of the sync pre-signals. That is, the ramp signal as a target whose phase is compared with that of the sync pre-signal is a signal having a repetitive period of the sync frame serving as a unit block constructing the recording sector instead of the period of the recording sector. By sampling and holding the amplitude level of the ramp signal at the detection timing of the sync pre-signal, the phase difference for the reference signal is detected. Like a pattern 2 or 3 in FIG. 3, therefore, so long as the recording interval of the sync pre-signal changes on a sync frame unit basis, the phase error signal can be accurately extracted.

On the other hand, the data pre-signal is recorded in accordance with the pre-data and the "0" data is not recorded as a pre-pit as mentioned above. In accordance with the pre-data to be recorded, therefore, the output timing of the timing signal SPP which is generated from the pre-pit signal reproducing circuit 11 fluctuates. For example, when the pre-data to be recorded is "1011001 . . . ", the output interval of the timing signal SPP is set to 4 sync frames, 2 sync frames, 6 sync frames, . . .

In such a case, however, since the recording interval of the pre-pits fluctuates on a sync frame unit basis, according to the phase comparing circuit 15 in the embodiment for comparing the phase with that of the ram signal of the sync frame period, the accurate phase difference signal can be extracted.

As described above, according to the rotation control apparatus SS1 of the embodiment, since the signals in which the ramp signal of the sync frame period has been sampled and held at the detection timing of the pre-information recorded on the information recording medium is used as a control signal and the rotation control is carried out, even when the period at which the pre-pit signal comprising the sync pre-signal and the data pre-signal is detected changes on a sync frame unit basis, the rotating state (CLV) of the DVD-R 1 can be maintained without changing it.

In the optical disk in which information data can be written like a DVD-R, when the information data is recorded, even in case of an optical disk whose rotation phase is controlled by the rotation control apparatus as described in the embodiment, a fine fluctuation component (jitter) on the time base due to an eccentricity or the like of the optical disk remains. When the information data is recorded on the optical disk, therefore, the timing to record the information data needs to be accurately synchronized with the fluctuation component by the jitter. A phase synchronizing apparatus suitable in an optical disk or the like such as a DVD-R mentioned above such that parts of sync pre-signals have been recorded at intervals different from those of the other sync pre-signals will now be described hereinbelow.

FIG. 11 shows an information recording apparatus which can write information data to the DVD-R 1 which is rotated by the foregoing rotation control apparatus.

A whole construction will be first explained. In FIG. 11, the same component elements as those in FIG. 4 are designated by the same reference numerals and their descriptions are omitted.

The information recording apparatus shown in FIG. 11 is constituted by: an RAM (Random Access Memory) 50 in which information data is previously stored; an FIFO (First In First Out) memory 51 for reading out the information recording data from the RAM 50, temporarily storing the recording information data on the basis of the write clock signal SREF as a period signal (reference signal) of the unit length T which is supplied from the reference signal generator 13 and corresponds to the bit interval of the recording information data, and sequentially reading out the stored information data in accordance with the storing order on the basis of a read clock signal SCKV1 as the same frequency as that of the write clock signal SREF which is supplied from a PLL (Phase Locked Loop) circuit 52, which will be explained hereinafter; the PLL circuit 52 for generating the read clock signal SCKV1 whose phase is synchronized with a jitter-component included in the pre-pit signal read out from the DVD-R 1, and an FF (Feed Forward) circuit 53 for absorbing residual error components which the PLL circuit 52 has.

A specific construction of the PLL circuit 52 will now be described.

The PLL circuit 52 is constituted by: a VCO (Voltage Controlled Oscillator) 521 for generating the foregoing read clock signal; a phase comparing circuit 522 for comparing the phase of the read clock signal SCKV1 from the VCO 521 with the phase of the pre-pit signal which is generated from the pre-pit signal reproducing circuit 11; and an amplitude phase equalizing circuit 523 for specifying an output signal from the phase comparing circuit 522 so as to obtain desired gain and phase characteristics in the PLL circuit 52.

The FF circuit 53 is constituted by: a VCO 531 whose oscillating frequency is controlled by a phase error signal which is not band limited by the amplitude phase equalizing circuit 523 that is supplied from the phase comparing circuit 522; and an FIFO memory 532 for temporarily storing the recording information data which is generated from the FIFO 51 and sequentially reading out the stored information data in accordance with the storing order on the basis of a clock signal SCKV2 which is supplied from the VCO 531.

The whole operation based on the above construction will now be described.

When a period signal of one recording sector period obtained by frequency diving the reference signal that is generated from the reference signal generator 13 by a frequency divider 131 at a predetermined frequency division ratio is supplied to the RAM 50, the recording information data recorded in an address designated by the CPU (not shown) is read out. The read-out recording information data is converted into serial data by a parallel/serial converter (not shown) and supplied to the FIFO 51. The FIFO 51 writes the recording information data on the basis of the write clock signal SREF which is supplied from the reference signal generator 13. At the same time, the recording information data is sequentially read out from the FIFO 51 in accordance with the writing order on the basis of the read clock signal SCKV1 that is obtained from the PLL circuit 52. In this instance, since the clock signal SCKV1 which is supplied from the PLL circuit 52 includes a phase fluctuation component synchronized with a low band component of the jitter component in association with the rotation control of the DVD-R 1, a data train of the recording information data which is read out from the FIFO 51 is phase synchronized with the low band component of the jitter component. The recording information data train read out from the FIFO 51 is further sent to the FF circuit 53. The FF circuit 53 is provided to get a phase synchronization for the high band jitter component which is not synchronized by the PLL circuit 52. The recording information data train whose phase is synchronized with the low band fluctuation component of the jitter component generated from the FIFO 51 is written into the FIFO 532 synchronously with the clock signal SCKV1 and is read out on the basis of the clock signal SCKV2 as an output signal from the VCO 531. An oscillating frequency of the output signal SCKV2 from the VCO 531 serving as a read clock signal of the FIFO 532 fluctuates on the basis of a phase difference signal that is generated from the phase comparing circuit 522 in the PLL circuit 52. The phase difference signal is what is called residual error components from which error components which can get a phase synchronization were eliminated by the PLL circuit 52. The phase synchronization, therefore, can be also obtained by the FF circuit 53 for the jitter component in which the phase synchronization cannot be obtained in the FIFO 51.

As mentioned above, by the two-stage construction of the FIFO 51 and FF circuit 53, the recording information data train in which the phase synchronization is obtained can be formed for a whole range of the jitter component that is generated in association with the rotation control of the DVD-R 1. The recording information data train which is supplied from the FF circuit 53 is transmitted to an APC (Auto Power Control) circuit (not shown) for controlling an irradiating power of the light beam B and the irradiating power is controlled in accordance with the data. In this instance, since the fluctuation on the time base of the recording information data train is synchronized with the fluctuation on the time base in accordance with the rotation control of the DVD-R 1 by the FIFO 51 and FF circuit 53, it can be recorded as a pit train having a desired pit length at a desired recording position on the disk.

When an operating band of the PLL circuit 52 is wide enough, it may not be necessary to provide the FF circuit 53.

The operation of the PLL circuit 52 will now be described.

The PLL circuit 52 is provided for changing the phase of the clock signal SCKV1 that is generated from the VCO 521 synchronously with the fluctuation on the time base of the pre-pit signal which is reproduced from the DVD-R 1.

Generally, the PLL circuit compares the phase of the sync signal recorded on the recording medium at a predetermined interval with the phase of the frequency division signal obtained by frequency dividing the clock signal generated from the VCO so as to have the same period as that of the sync signal and adjusts the oscillating period of the VCO so as to set the phase difference to 0, thereby performing the phase synchronization for the fluctuation component by the jitter included in the reproduction signal (sync signal). As for the sync signal, when parts of the sync signal are recorded at intervals different from those of the other sync signal parts like sync pre-signals in the DVD-R 1, the phase synchronizing state for a predetermined frequency cannot be maintained by the general PLL circuit construction.

Namely, when a general PLL circuit is applied with respect to the optical disk or the like such that parts of sync signal have been recorded at intervals different from those of the other sync signal parts, the intervals of the sync signal parts different from the intervals of the other sync signal parts as well, are phase compared with the period (corresponding to the intervals of the other sync signals) of the frequency division signal formed by frequency dividing the clock signal that is derived from the VCO. In the portion where the sync signal of the intervals different from those of the other sync signal parts is detected, the phase difference increases by an amount corresponding to the different value of the intervals of the sync signals, thereby deviating the oscillating frequency of the VCO from the inherent frequency (increasing or decreasing the frequency). Namely, the portion of the different intervals of the sync signals is recognized as a fluctuation on the time base in association with some disturbance applied to the recording medium, thereby changing the oscillating frequency so as to trace the fluctuation due to the disturbance.

Figure 12:
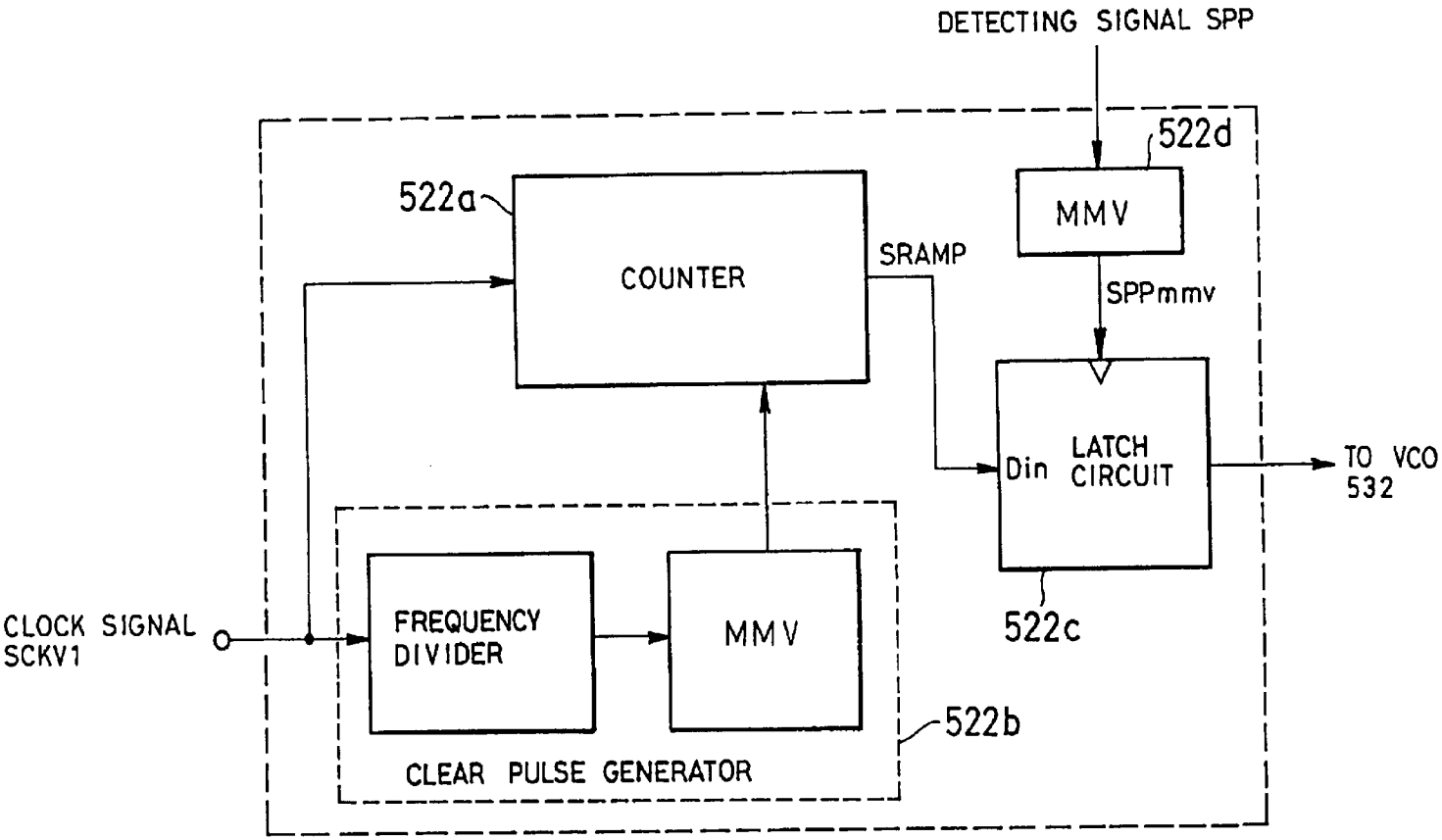
FIG. 12 is a block diagram showing a construction of a phase comparing circuit 522 in the information recording apparatus in FIG. 11.

In the PLL circuit 52 used in the embodiment, accordingly, the same construction as that of the phase comparing circuit 15 described in FIG. 8 is used as a phase comparing circuit 522 as shown in FIG. 12.

That is, the phase comparing circuit 522 is constituted by: a counter 522a for counting the clock signal SCKV1 having a period component of the unit length T corresponding to a bit interval of the recording information data which is formed by the VCO 521; a clear pulse generator 522b for frequency dividing the clock signal SCKV1 into 1/744 and generating a clear pulse signal at a sync frame period (1488 T) interval; and a latch circuit 522c for latching a count value which is generated from the counter by a timing signal which is generated from an MMV 522d and is synchronized with the timing of the timing signal SPP which is supplied from the pre-pit signal reproduction signal.

The reason why the phase comparison can be accurately performed by the phase comparing circuit 522 even in a case where parts of sync signal as comparison target are formed at intervals different from the intervals of the other sync signal parts like pre-pit signals which are formed in the DVD-R 1 is as described in the phase comparing circuits 14 and 15.

Namely, on the basis of the clock signal SCKV1 from the VCO, the signal in which the ramp signal having the sync frame period (1488 T) as a unit period in the recording format of the DVD-R 1 is sampled and held at the detection timing of the pre-information recorded on the information recording medium is used as a phase difference signal and the oscillating period of the clock signal SCKV1 which is generated from the VCO 521 is controlled. Even when the period at which the pre-pit signal comprising the sync pre-signal and the data pre-signal is detected changes on a sync frame unit basis, therefore, the clock signal SCV1 in which the phase synchronizing state for a predetermined frequency is maintained can be formed.

According to the first aspect of the invention as described above, the phase difference, relative to the unit period as a period which is a fraction, by the division by an integer number, of the period of the pre-pits, is compared at timings when the pre-pit is detected and the rotation of the motor is controlled so as to set off the phase difference. Consequently, even when no pre-pit is derived at predetermined periodic intervals, a predetermined rotating state can be accurately obtained.

Therefore, even in an information recording medium, therefore, on which parts of the sync signals are at a recording interval that is deviated from predetermined intervals, information can be accurately recorded and reproduced by maintaining the accurate rotating state.

According to the second aspect of the invention, in addition to the effect of the first aspect of the invention, the unit period signal generator generates the monotonous increase signal having the unit period while the phase difference detector detects the phase difference on the basis of the amplitude value of the monotonous increase signal at the detection timing of the pre-pit, so that the phase difference can be detected by a simple process.

According to the third aspect of the invention, the coarse phase difference signal is obtained by comparing the phase difference relative to the unit period as a period which is a fraction, by the division by an integer number, of the period of intervals of the sync pits at the detection timings of the sync pits which are detected at relatively coarse intervals, the fine phase difference signal is obtained by comparing the phase difference for the unit period as a period which is a fraction, by the division by an integer number, of the period of intervals of the pre-pits detection timings of the pre-pits that comprise the sync pre-signal and the data pre-signal and are detected at relatively dense intervals, and the addition phase difference signal is produced by adding the coarse phase difference signal and the fine phase difference signal. The rotation of the motor is controlled on the basis of the addition phase different signal so as to set off the phase difference. Even when no pre-pit is derived at predetermined periodic intervals, therefore, a predetermined rotating state can be accurately obtained. In addition, a rotation control of a higher precision can be carried out as compared with the rotation control by only the sync pits.

Even in an information recording medium in which parts of the sync signal are recorded at a recording interval that is deviated from predetermined intervals, therefore, the information can be accurately recorded and reproduced by maintaining an accurate rotating state.

The invention has been described above with reference to the preferred embodiments. The person will ordinary skill in the art should understand that various modifications and variations of the invention can be presumed. All of the modifications and variations are also incorporated in the scope of the claim for a patent of the invention.

What is claimed is:

1. An information data recording apparatus for recording information data on an information recording medium having pre-pits which are formed at periodic intervals having a period that is m, m being an integer, times as large as a unit period in accordance with pre-information recorded at an interval which deviates from said periodic intervals by an interval that is k, k being an integer, where k<m, times said unit period in accordance with recording positions, said apparatus comprising:

a unit [period] *length* signal generator which generates a periodic signal of [said] *a* unit [period] *length*;

a memory for temporarily storing said information data in synchronism with said periodic signal from said unit [period] *length* signal generator and supplying said information data in synchronism with a clock signal;

a pre-pit signal reproducing circuit for detecting said pre-pits from said recording medium and generating a pre-pit signal;

a phase-locked loop circuit for generating said clock signal which is phase-locked with a jitter component contained in said pre-pit signal; and a recording means for recording said information data supplied from said memory on said recording medium.

2. An information data recording apparatus as claimed in claim 1, wherein said phase-locked loop circuit comprises:

a voltage controlled oscillator for generating said clock signal in accordance with a control voltage;

a phase comparator circuit for comparing said pre-pit signal generated by said pre-pit signal reproducing circuit with said clock signal generated by said voltage controlled oscillator and producing a phase comparison output signal; and an amplitude and phase equalizing circuit for adjusting amplitude and phase of said phase comparison output signal of said phase comparator to produce said control voltage supplied to said voltage controlled oscillator.

3. An information data recording apparatus as claimed in claim 1, further comprising a feed-forward circuit for eliminating a phase error in said information data supplied from said memory, said phase error corresponding to a residual phase error component of said clock signal generated by said phase-locked loop circuit.

4. An information data recording apparatus as claimed in claim 3, wherein said feed-forward circuit comprises:

a second memory for storing said information data supplied from said memory in synchronism with said clock signal and supplying said information data to said recording means in synchronism with a second clock signal; and a voltage controlled oscillator for generating said second clock signal in accordance with said phase comparison output signal of said phase comparator circuit.

*5. An information data recording apparatus as claimed in claim 1, wherein said unit length corresponds to a bit interval that is specified by a recording format used for recording the information data.*

*6. An information data recording apparatus as claimed in claim 1, wherein said unit period is a sync frame.*

*7. An information data recording apparatus as claimed in claim 6, wherein said sync frame has a length which is 1488 times the unit length.*

* * * * *